Dec. 9, 1941.  H. LANGE ET AL  2,265,177
PROCESS OF PREPARING VINYLMETHYL-KETONE
Filed Nov. 29, 1938
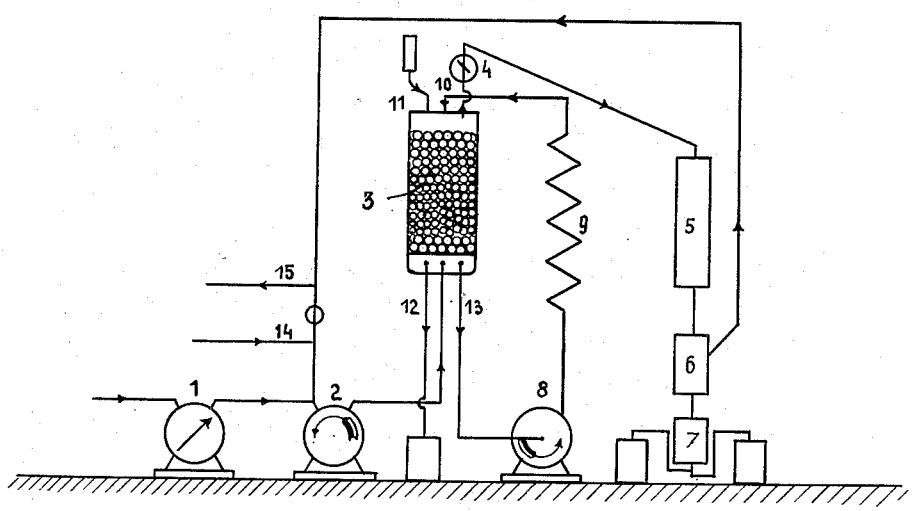
Heinrich Lange
Otto Horn
INVENTORS
BY
THEIR ATTORNEYS Patented Dec. 9, 1941

2,265,177

UNITED STATES PATENT OFFICE 2,265,177

PROCESS OF PREPARING VINYLMETHYL-KETONE

Heinrich Lange and Otto Horn, Frankfort-on-the-Main-Hochst, Germany, assignors to I. G. Farbenindustrie Aktiengesellschaft, Frankfort-on-the-Main, Germany Application November 29, 1938, Serial No. 242,910
In Germany December 2, 1937

7 Claims. (Cl. 260—597)

The present invention relates to a process of preparing vinylmethyl-ketone.

Various processes are already known for the manufacture of vinylmethyl-ketone from vinylacetylene by the addition of water in the presence of catalysts which consist of salts, oxides and hydroxides of mercury, silver, copper, cadmium or zinc and are soluble in aqueous acid solutions. The water may be added discontinuously or continuously, in the latter case by introducing the vinylacetylene into the aqueous catalyst at a temperature which causes the ketone continuously to distil from the solution together with the escaping vinylacetylene; during this operation care has to be taken that water takes the place of that consumed and if necessary the unconsumed vinylacetylene is reconducted into the catalyst (see U. S. Patent No. 1,896,161).

It has been found that this method is not applicable for the manufacture of vinylmethyl-ketone on an industrial scale because the pressure required for circulating the vinylacetylene and for introducing it into high columns containing much liquid has to be avoided for safety's sake (danger of self-decomposition). Furthermore, the resin formed as a by-product during the polymerization increases to such an extent that it causes great disturbance.

Now we have found that vinylmethyl-ketone can be made on an industrial scale by causing a contact liquid and vinylacetylene to flow in a circuit in counter-current. During this operation vinylmethyl-ketone and steam are continuously withdrawn and a new quantity of contact and water are continuously added; part of the contact together with the polymerization resin formed are continuously removed. It is suitable to use a counter-current apparatus in which the contact liquid is pumped in a cycle, for instance by means of a centrifugal pump and caused to flow down a column containing filling bodies; the vinylacetylene is introduced from below by means of a blast and thus flows in counter-current to the contact liquid. This principle may be applied on any scale without causing a rise of pressure in the apparatus; it affords a useful method for the manufacture of vinylmethyl-ketone. The contact required for the addition of water is continuously added at the top of the column by means of a charging pump and part of the contact is continuously pumped from the sump of the column. For uniform and continuous operation it is of advantage to pass the condensed mixture of vinylmethyl-ketone and water through a film evaporator heated to a temperature about 40° C.—45° C. which allows the retention in the liquid of so much vinylacetylene (about 5—8 per cent), that the crude ketone separates well from the water (see our co-pending U. S. application Serial No. 165,340 filed September 23, 1937). The vinylacetylene expelled by the heat is returned to the cycle; the vinylacetylene consumed is replaced by a fresh quantity of gas which is circulated by a pump. According to the conditions applied, the yields in this process are between 65 and 85 per cent. calculated upon the vinyl-acetylene consumed. The process is not disturbed by the presence of inert gases.

The accompanying diagram serves to illustrate the invention:

The vinylacetylene passes through a gas meter 1 and a pump 2 and enters a column charged with filling bodies 3, where in the presence of a catalyst, for instance a mercury contact, the water is condensed with the vinylacetylene; the excess of vinylacetylene charged with vinylmethyl ketone and steam then enters the condensing plant 5 by way of a separator 4; in order to eliminate the excess of vinylacetylene dissolved in the mixture of vinylmethyl ketone and water the mixture is introduced into a film evaporator 6. The crude vinylmethyl ketone is separated in a separator 7 from the aqueous vinylmethyl ketone solution and worked up in known manner. The vinylacetylene eliminated by heat in the film evaporator 6 returns to the pump 2. In a second cycle the pump 8 forces the contact liquid through a heating coil 9 where the contact is heated to the necessary temperature, into the head 10 of the column, whence the liquid flows down among the filling bodies in counter-current to the vinylacetylene. The contact and water required for replenishment are continuously delivered together at 11 and part of the contact is continuously eliminated at 12 from the column sump. 13 is the intake of the contact liquid into the pump 8. If desired, it is possible to maintain an atmosphere of nitrogen in the apparatus through the pipe 14 or to eliminate gas through pipe 15. By a number of control devices (manometer, rotameter, thermometer) which are mounted at different parts of the apparatus the conditions of pressure, flow and temperatures within the apparatus may be controlled.

It is advantageous, to carry out the reaction between water and vinylacetylene at a temperature of about 70° C. to about 71° C. The excess pressure within the apparatus amounts to about 10 millimeters of mercury; it is due to the frictional resistance of the conduit.

We claim:

1. In the process of preparing vinylmethyl-ketone from vinylacetylene and water in the presence of contacts the steps which comprise causing the aqueous contact liquid to flow continuously in a circuit and causing vinylacetylene to flow continuously in another circuit counter-current to the circuit of the contact liquid, heating the contact liquid in the circuit externally of the tower in which the contact liquid and vinylacetylenes are brought together and introducing the heated contact liquid at the top of said tower.

2. In the process of preparing vinylmethyl-ketone from vinylacetylene and water in the presence of contacts the steps which comprise causing the aqueous contact liquid and vinylacetylene to flow in circuits in counter-current, continuously withdrawing vinylmethyl-ketone and steam, continuously adding fresh vinylacetylene corresponding to the amount consumed, continuously adding a new quantity of contact and water and continuously removing part of the contact together with the polymerization resin formed.

3. The process as defined in claim 2 wherein the contact liquid is heated externally of the tower in which the contact liquid and vinylacetylene are brought together and the heated contact liquid is reintroduced at the top of said tower.

4. In the process of preparing vinylmethyl-ketone from vinylacetylene and water in the presence of contacts the steps which comprise causing the aqueous contact liquid and vinylacetylene to flow in circuits in counter-current, continuously withdrawing and condensing vinylmethyl-ketone and steam, expelling by heat and returning to the circuit the vinylacetylene contained in said condensed mixture of water and vinylmethyl-ketone, continuously adding to the circuit fresh vinylacetylene corresponding to the amount consumed, continuously adding a new quantity of contact and water and continuously removing part of the contact together with the polymerization resin formed.

5. The process as defined in claim 4 wherein the contact liquid is heated externally of the tower in which the contact liquid and vinylacetylene are brought together and the heated contact liquid is reintroduced at the top of said tower.

6. In the process of preparing vinylmethyl-ketone from vinylacetylene and water in the presence of contacts the steps which comprise causing the aqueous contact liquid and vinylacetylene to flow in circuits in counter-current, continuously withdrawing and condensing vinylmethyl-ketone and steam, expelling by heat and returning to the circuit such an amount of the vinylacetylene contained in said condensed mixture of water and vinylmethyl-ketone that the crude vinylmethyl-ketone separates from the water, continuously adding to the circuit a fresh vinylacetylene corresponding to the amount consumed, continuously adding a new quantity of contact and water and continuously removing part of the contact together with the polymerization resin formed.

7. The process as defined in claim 6 wherein the contact liquid is heated externally of the tower in which the contact liquid and vinylacetylene are brought together and the heated contact liquid is reintroduced at the top of said tower.

HEINRICH LANGE.
OTTO HORN.